(12) United States Patent
Mizuno et al.

(10) Patent No.: US 8,013,950 B2
(45) Date of Patent: Sep. 6, 2011

(54) OPTICAL SHEET COMBINATION STRUCTURE, SURFACE EMITTING DEVICE, AND LIQUID CRYSTAL DEVICE

(75) Inventors: Hiroshi Mizuno, Miyagi (JP); Akihiro Horii, Tokyo (JP); Noriyuki Hirai, Miyagi (JP); Kei Obata, Miyagi (JP); Mitsunari Hoshi, Miyagi (JP); Kiyohiro Kimura, Miyagi (JP); Jun Sasaki, Miyagi (JP)

(73) Assignee: Sony Corporation, Tokyo (JP)

( * ) Notice: Subject to any disclaimer, the term of this patent is extended or adjusted under 35 U.S.C. 154(b) by 231 days.

(21) Appl. No.: 12/048,098

(22) Filed: Mar. 13, 2008

(65) Prior Publication Data

US 2008/0303975 A1    Dec. 11, 2008

(30) Foreign Application Priority Data

Mar. 19, 2007    (JP) .................. 2007-070547

(51) Int. Cl.
*G02F 1/1335*    (2006.01)

(52) U.S. Cl. ............ 349/62; 349/65; 362/339; 362/97.2

(58) Field of Classification Search .................... 349/57, 349/95, 65, 118, 96, 62; 362/339, 340, 331, 362/336, 311, 620, 626, 311.09, 311.1
See application file for complete search history.

(56) References Cited

U.S. PATENT DOCUMENTS

| | | | | |
|---|---|---|---|---|
| 5,780,140 A * | 7/1998 | Nilsen | ............... | 428/172 |
| 6,903,788 B2 * | 6/2005 | Shiraogawa et al. | ......... | 349/115 |
| 7,529,048 B2 * | 5/2009 | Lin | ................ | 359/831 |
| 2001/0010884 A1 | 8/2001 | Guehler et al. | | |
| 2004/0190138 A1 * | 9/2004 | Toyomasu et al. | ............ | 359/494 |
| 2006/0141220 A1 | 6/2006 | Merrill et al. | | |
| 2006/0274244 A1 | 12/2006 | Battiato et al. | | |
| 2007/0285778 A1 * | 12/2007 | Walker et al. | ................ | 359/488 |
| 2008/0225201 A1 * | 9/2008 | Hoshi | ............................. | 349/62 |

FOREIGN PATENT DOCUMENTS

| | | |
|---|---|---|
| EP | 1326102 | 7/2003 |
| JP | 2000-221324 | 8/2000 |
| JP | 2002-544565 | 12/2002 |
| JP | 2004-168869 | 6/2004 |
| JP | 2006-078917 | 3/2006 |
| JP | 2008-525849 | 7/2008 |

OTHER PUBLICATIONS

Japanese Office Action issued on Feb. 10, 2009, for corresponding Japanese Patent Application JP 2007-070547.
European Search Report for corresponding European Application No. 08004626.1 dated Sep. 21, 2009.

* cited by examiner

*Primary Examiner* — Thoi V Duong
(74) *Attorney, Agent, or Firm* — K&L Gates LLP

(57) ABSTRACT

An optical sheet combination structure disposed between a polarizer and a surface emitting unit, includes a first optical sheet having a number of columnar cubic structures of curing resin arrayed on a transparent base, a valley portion between adjacent cubic structures contacting a surface of the transparent base, and a second optical sheet disposed nearer to the side of the polarizer than the first optical sheet, having a number of columnar cubit structures arrayed on a surface, and a refractive index of the cubic structures along an extension direction thereof being different from a refractive index of the cubic structures along an array direction thereof.

14 Claims, 16 Drawing Sheets

OPTICAL SHEET COMBINATION STRUCTURE, SURFACE EMITTING DEVICE, AND LIQUID CRYSTAL DEVICE

CROSS-REFERENCE TO RELATED APPLICATIONS

The present application claims priority to Japanese Patent Application No. 2007-070547 filed in the Japanese Patent Office on Mar. 19, 2007, the entire content of which being incorporated herein by reference.

BACKGROUND

The present application relates to an optical sheet combination structure improving a luminance by utilizing two optical sheets, a surface emitting device equipped with the optical sheet combination structure, and a liquid crystal display.

A liquid crystal display (LCD) can realize lower consumption power and can be made more compact and thinner than a cathode ray tube (CRT). Liquid crystal displays of various sizes are presently used widely for compact apparatus such as mobile phones, portable game machines, digital cameras, personal digital assistants (PDA's) and for large scale liquid crystal televisions.

Liquid crystal displays are classified into a transmission type, a reflection type and the like. A liquid crystal display, particularly a transmission type liquid crystal display includes a liquid crystal display panel, a first polarizer (polarizing plate) disposed on a light incident side of a liquid crystal display panel and a second polarizer (polarizing plate) disposed on a light emit side of the liquid crystal display panel as well as a backlight unit as an illumination light source. The backlight unit includes a direct-under type disposing a light source directly below a liquid crystal display panel, and in addition an edge light type. A backlight unit of the edge light type is configured by including an light guide plate disposed on the back plane of a liquid crystal display panel, a light source disposed at one edge of the light guide plate, a reflection plate covering the plane opposite to the light emit plane of the light guide plate, and the like.

Cold cathode fluorescent lamps (CCFL) for emitting white light have been used widely as light sources for backlight units of the types described above. Particularly in recent years, a backlight unit using a light emitting diode (LED) as a light source is expected for use with mobile use displays, such as mobile phones or the like. A hot cathode fluorescent lamp (HCFL) can also be used as a light source.

A luminance in a front surface direction is desired for mobile use displays. An approach to restricting a light emit direction of backlight toward the front surface direction has therefore been adopted. For example, there is known an arrangement in which an optical sheet called a luminance improving film or sheet is disposed between a backlight unit and a liquid crystal display panel to direct a light emit direction of backlight toward a front surface direction (refer to Japanese Patent National Publication No. 2002-544565, Patent Document 1, and Japanese Patent Application Publication No. 2004-168869, Patent Document 2).

The luminance improving film is constituted of a prism sheet having triangular prisms arranged on one plane periodically at a micro pitch, and has a function of raising and converging backlight toward the front surface direction. Particularly, there are known an arrangement of superposing two prism sheets by making prism extension directions perpendicular to each other, and an arrangement in which a reflective polarizing sheet is disposed on a prism sheet, the reflective polarizing sheet transmitting ones of linear polarization components and reflecting the others of linear polarization components (refer to Patent Document 1).

FIG. 14 is an exploded perspective view showing an example of the structure of a related art liquid crystal display. The liquid crystal display 1 shown in FIG. 14 includes a liquid crystal display panel 2, a first polarizer 3A and a second polarizer 3B disposed on the light incident and emit sides of the liquid crystal display panel 2, respectively, and a surface light emitter 4. The first and second polarizers 3A and 3B are disposed to make both transmission axes perpendicular to each other (cross Nicol). Although not shown, a phase difference film is often disposed on the liquid crystal display panel 2 to optically compensate for birefringence of a liquid crystal layer and the like.

The surface light emitter 4 is configured by including a light guide plate 5 made of translucent material, a light source 6 disposed on one end of the light guide plate 5, a reflection plate 7 covering the plane opposite to the light output plane of the light guide plate 5. Although the light source 6 is shown as a point light source such as an LED, it may use a linear light source such as a fluorescent lamp.

Sequentially disposed between the light guide plate 5 and first polarizer 3A are a diffusion sheet 8, a first prism sheet 9A, a second prism sheet 9B and a reflective polarizing sheet 10. The first and second prism sheets 9A and 9B are each made of a prism sheet having the same structure, disposed with its prism forming surface being faced toward the liquid crystal display panel 2, and are superposed to make ridge (extension) directions of the prisms perpendicular to each other.

The reflective polarizing sheet 10 has a function of amplifying and transmitting ones of linear polarizing components of light output from the prism sheet 9B and the others of the linear polarizing components has reflecting function. Polarizing components transmitted through the reflective polarizing sheet 10 are input to the liquid crystal display panel 2 through the transmission axis of the first polarizer 3A. It is possible to increase a front surface luminance at each layer, by disposing the reflective polarizing sheet 10 so as to make the linear polarizing components in an amplification direction parallel to the transmission axis direction of the first polarizer 3A.

The prism sheets 9A and 9B are generally formed by laminating a curing resin layer made of active energy ray curing resin on the surface of a transparent base (refer to Patent Document 2). FIG. 15 is a schematic diagram showing the structure of the related art prism sheets 9A and 9B hereinafter collectively called a prism sheet 9, unless the sheets are described separately). The prism sheet 9 has a structure that a curing resin layer 12 is laminated integrally on the surface of a transparent base 11. The curing resin layer 12 is formed of active energy ray curing resin which is cured upon exposure to an active energy ray such as an ultraviolet ray and an electron beam.

The curing resin layer 12 of the related art prism sheet 9 is constituted of a number of triangular prisms 12a disposed at a constant pitch and a skirt layer (base layer) 12c for supporting a number of prisms 12a. A total thickness (H) of the prism sheet 9 is represented by a sum of a thickness (D2) of the transparent base 11 and a thickness (D3) of the curing resin layer 12. A height of the prism 12a is represented by a depth (D1) of a valley portion 12b of adjacent prisms 12a. The skirt layer 12c is interposed between the surface of the transparent base 11 and the prisms 12a, and its thickness (ΔDy) corresponds to a difference (D3-D1) between the thickness of the curing resin layer 12 and the height of the prism 12a.

In recent mobile use displays, thinning of the entire display and realizing high image quality has been required In the related art liquid crystal display described above, at least three or more optical sheets including the first and second prism sheets 9A and 9B and reflective polarizing sheet 10 are required in order to improve a front surface luminance of the liquid crystal display panel. Since there is a limit in thinning and thickening each optical sheet, it is very difficult to thin considerably a total thickness of optical sheets (a total thickness of the three-sheet configuration described above is about 250 μm). For example, the reflective polarizing sheet 10 shown in FIG. 14 is particularly difficult to thin, because this sheet is a laminated type sheet. Therefore, the structure of the related art liquid crystal display 1 results in lower productivity and increased manufacture cost and in difficulty of thinning the whole display, because of an increase in the number of used sheets.

Particularly in a mobile use liquid crystal display, the transmission axis of the first polarizer 3A on the backlight side is often disposed by rotating several tens of degrees at maximum from the cross Nicol state relative to the second polarizer 3B, in order to optimize the display characteristics such as contrast when a phase difference film is combined. In this case, an angle shift between the transmission axis of the first polarizer 3A and the polarizing components outputted from the reflective polarizing sheet 10 becomes large, thereby posing a problem that the front surface luminance is lowered greatly. FIG. 16 shows an example of a relation between a rotation angle of the transmission axis of the first polarizer with respect to the transmission axis of the second polarizer and a front surface luminance, with the front surface luminance being set to "1" in the cross Nicol state. As apparent from FIG. 16, a reduction rate of a luminance is large relative to a rotation angle of the transmission axis of the first polarizer. In the related art liquid crystal display, as the rotation adjustment is performed for the transmission axis of the first polarizer 3A, an optical axis of the reflective polarizing sheet 10 is also required to be adjusted, arising a possibility of lowering assembly efficiency or productivity.

SUMMARY

It is desirable to provide an optical sheet combination structure, a surface emitting device and a liquid crystal display, capable of reducing the number of optical sheets to be used and a total thickness of the optical sheets to improve a front surface luminance, and suppressing a luminance from being lowered by rotation adjustment of a polarizer.

An embodiment of the present application provides an optical sheet combination structure to be disposed between a polarizer and a surface emitting unit includes a first optical sheet having a number of columnar cubic structures of curing resin disposed on a transparent base, and a valley portion between adjacent cubic structures contacting a surface of the transparent base, and a second optical sheet disposed on the side nearer to the polarizer than the first optical sheet and having a number of columnar cubit structures arranged on the surface, and a refractive index in an extension direction of the cubic structures being different from a refractive index in an array direction of the cubit structures.

More specifically, the cubic structure of the first and second optical sheets is a triangle prism having a predetermined apex angle. Namely, the first and second optical sheets are structured as first and second prism sheets. In the following description, it is assumed that the first and second optical sheets are prism sheets. The cubic structure is not limited to the prism, but it may be a lenticular lens.

In an embodiment, the transparent base of the first prism sheet contacts the valley portion between adjacent prisms. Therefore, a skirt layer not functioning as a prism does not exist between the transparent base and prisms. That "the skirt layer does not exist" is intended to mean that the skirt layer does not exist at all literally and that the skirt layer exists slightly (e.g., 0.28 μm or thinner) because of manufacture errors or the like. A transmittivity increases more than if the skirt layer exists, and the luminance can be improved.

By forming dents on the surface of the transparent base in correspondence with the valley portions between prisms and forming a convex curved plane on the surface of the transparent base between the dents, it becomes possible to realize some lens effect on the surface of the transparent base and improve further the front surface luminance.

The second prism sheet has a refractive index difference between the prism extension direction and the array direction perpendicular to the prism extension direction. Therefore, with respect to light incident upon the second prism sheet, polarizing components oscillating in the prism extension direction and polarizing components oscillating in the prism array direction can have different transmission characteristics. For example, if a refractive index in the prism extension direction is made higher than a refractive index in the prism array direction, it becomes possible to increase an output light amount of polarizing components oscillating in the prism array direction, out of the light incident upon the second prism sheet. A difference in transmission characteristics of polarizing components becomes larger as a refractive index difference becomes larger between the prism extension and array directions. The second prism sheet provides therefore a constant polarization separation function in addition to a light convergence function.

The second prism sheet having such refractive index anisotropy can be manufactured by performing drawing processing of a resin sheet formed with prisms provided on the surface thereof, in the prism extension direction. The reason why the drawing direction of the resin sheet is set to the prism extension direction is to reduce variance of the optical characteristics caused by the change of the prism shape before and after drawing. If the refractive index in the prism extension direction is set higher than that in the prism array direction, material having a higher refractive index in the drawing direction is selected as the constituent material of the resin sheet. Material having a higher refractive index in the drawing direction may be polyethylene terephthalate (PET), polyethylene naphthalate (PEN), mixture thereof, copolymer such as PET-PEN copolymer, polycarbonate, polyvinyl alcohol, polyester, polyvinylidene fluoride, polypropylene, polyamide or the like.

The surface emitting device or liquid crystal display is formed by disposing the first prism sheet on side of the main body of the surface emitting unit and the second prism sheet on the polarizer side. Therefore, in addition to the luminance improvement effect obtained by superposing two prism sheets, the second prism sheet has a function similar to that of the related art reflective polarizing sheet so that the reflective polarizing sheet is not necessary. The number of optical sheets to be set required for improving the front surface luminance can therefore be reduced. The number of optical sheets to be used can be reduced, and a total thickness of optical sheets can be thinned. Therefore, the liquid crystal display can made sufficiently thin.

The polarizing function of the second prism sheet can be adjustable by its in-plane refractive index difference (birefringence). It is therefore possible to optimize the polarizing characteristics considering a rotation adjustment amount of the transmission axis of the polarizer. It is possible to suppress a front surface luminance reduction to be caused by the angle shift between the transmission axis of the first polarizer and the anisotropic optical axis of the second prism sheet.

Additional features and advantages are described herein, and will be apparent from the following Detailed Description and the figures.

DETAILED DESCRIPTION

An embodiment of the present application will be described with reference to the accompanying drawings.

Figure 1:
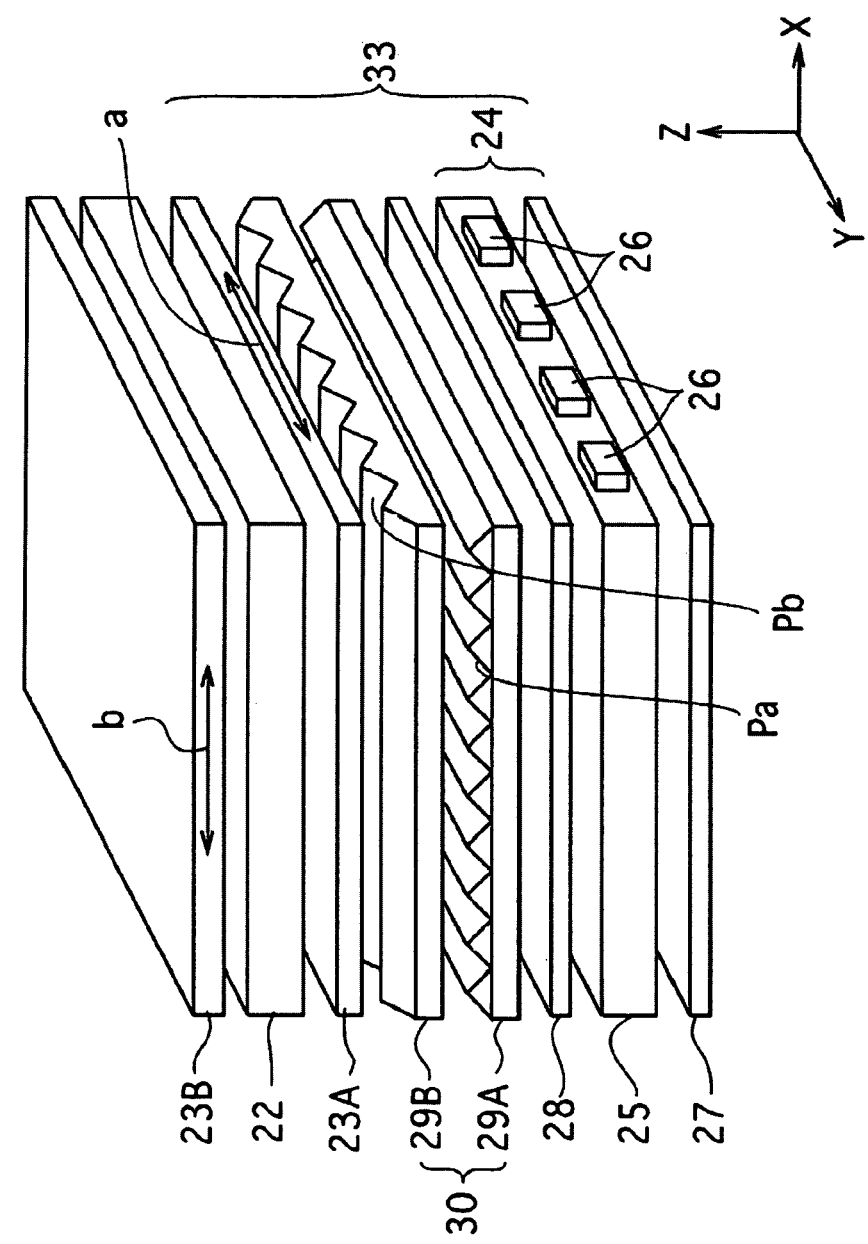
FIG. 1 is an entire perspective view showing the outline structure of a liquid crystal display according to an embodiment.
Figure 2:
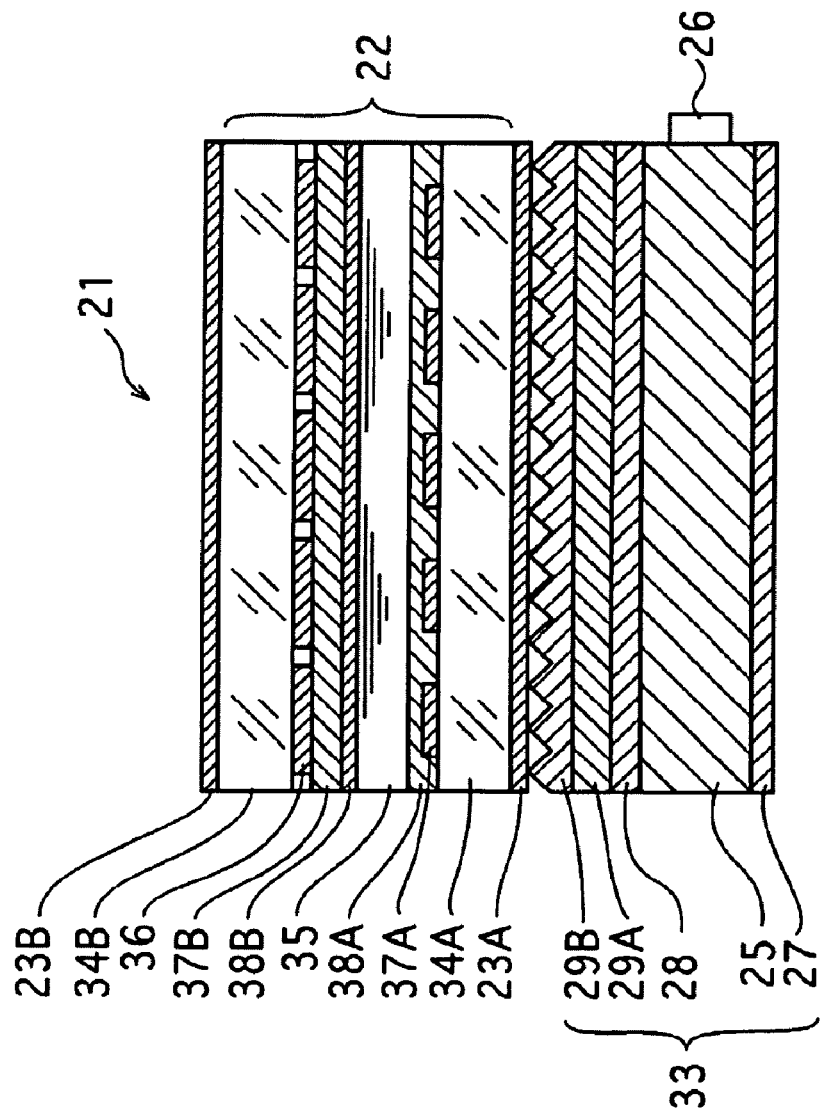
FIG. 2 is a cross sectional view showing the outline structure of the liquid crystal display according to an embodiment.

FIG. 1 is an exploded perspective view showing the outline structure of a liquid crystal display 21 equipped with an optical sheet combination structure 30 according to the embodiment of the present invention, and FIG. 2 is a cross sectional view showing the outline of the liquid crystal display 21. First, the whole structure of the liquid crystal display 21 will be described.

The liquid crystal display 21 of the embodiment includes a liquid crystal display panel 22, first and second polarizer 23A and 23B sandwiching the liquid crystal display panel 22, and a surface emitting apparatus 33. The surface emitting apparatus (backlight apparatus) 33 is configured by including a surface emitting unit 24, a diffusion sheet 28, an optical sheet combination structure 30 of the present invention, and a first polarizer 23A.

As shown in FIG. 2, the liquid crystal display panel 22 has a lamination structure where a liquid crystal layer 35 is disposed between a transparent substrate 34A on the side of the surface emitting apparatus 33 and a transparent substrate 34B on the side of an observer. More specifically, this lamination structure has the transparent substrate 34A, a transparent pixel electrode 37A, an alignment film 38A, the liquid layer 35, an alignment film 38B, a transparent electrode 37B, a color filter 36 and the transparent substrate 34B, sequentially in this order from the side of the surface emitting apparatus 33. If necessary, a phase difference film for optically compensating birefringence of the liquid crystal layer 35 and the like is disposed on at least one of the transparent substrates 34A and 34B of the liquid crystal display panel 22.

The first polarizer 23A is a polarizing plate disposed on the light input side of the liquid crystal display panel 22, and the second polarizer 23B is a polarizing plate disposed on the light output side of the liquid crystal display panel 22. A transmission axis A of the first polarizer 23A is set in a Y-axis direction shown FIG. 1, and a transmission axis B of the second polarizer 23B is set in a X-axis direction shown FIG. 1. The two X- and Y-axes are perpendicular on the display screen of the liquid crystal display panel 22, and a Z-axis is parallel to a thickness direction of the liquid crystal display 21 which is perpendicular to the X- and Y-axes.

The surface emitting unit 24 shown is constituted of an edge light type backlight unit, but may be constituted by a direct-under type backlight unit. The surface emitting unit 24 includes an light guide plate 25 made of translucent material, a light source 26 disposed at one end of the light guide plate 25, a reflection plate 27 covering the plane opposite to the light emitting plane of the light guide plate 25, and the like. Although the light source 26 is shown in a figure as a point light source such as an LED, it may use a single linear light source or a plurality of linear light sources such a fluorescent lamp (CCFL, HCFL).

Between the light guide plate 25 and first polarizer 23A, a diffusion sheet 28, a first prism sheet 29A and a second prism sheet 29B are sequentially disposed in this order. The diffusion sheet 28 has a function of diffusing and emitting light outputted from the light guide plate 25, in a predetermined angle range, and is provided to make uniform a luminance distribution of the surface emitting unit 24. The first and second prism sheets 29A and 29B constitute the optical sheet combination structure 30 of the present invention, and function as luminance improving sheets for improving a front surface luminance by converging light outputted from the diffusion sheet 28 to the front surface direction of the liquid crystal display panel 22.

The first and second prism sheets 29A and 29B correspond to the first and second optical sheets of the present invention, respectively. The first and second prism sheets 29A and 29B have a number of prisms Pa and Pb arranged on the surfaces thereof, respectively, and are disposed with the prism formed planes being faced to the side of the liquid crystal display panel 22. The second prism sheet 29B is disposed on the side nearer to the liquid crystal display panel 22 than the first prism sheet 29A. The prism sheets 29A and 29B are superposed to make the ridge (extension) directions of the prisms Pa and Pb becomes perpendicular to each other. A total thickness of the first and second prism sheets 29A and 29B is set to 100 μm or thinner.

More specifically, in this embodiment, a sheet thickness of each of the first and second prism sheets 29A and 29B is 40

μm, and a total thickness can be set to be 80 μm. The first and second prism sheets 29A and 29B can be structured to have a thickness of 20 μm and, in this case, a total thickness becomes 40 μm.

The prism sheets 29A and 29B may be integrated by using an adhesive layer. In this case, the adhesive layer is preferably made of transparent material having a lower refractive index than that of the prism sheets 29A and 29B. The apex angle, shape and the like of the prisms Pa and Pb are not specifically limited. In this embodiment, the prism has a right angled triangle shape having an apex angle of 90 degree. Instead of prisms, other cubic structures such as a lenticular lens may also be used.

Next, the details of the optical sheet combination structure 30 will be described.

First, the details of the first prism sheet 29A will be described.

Figure 3:
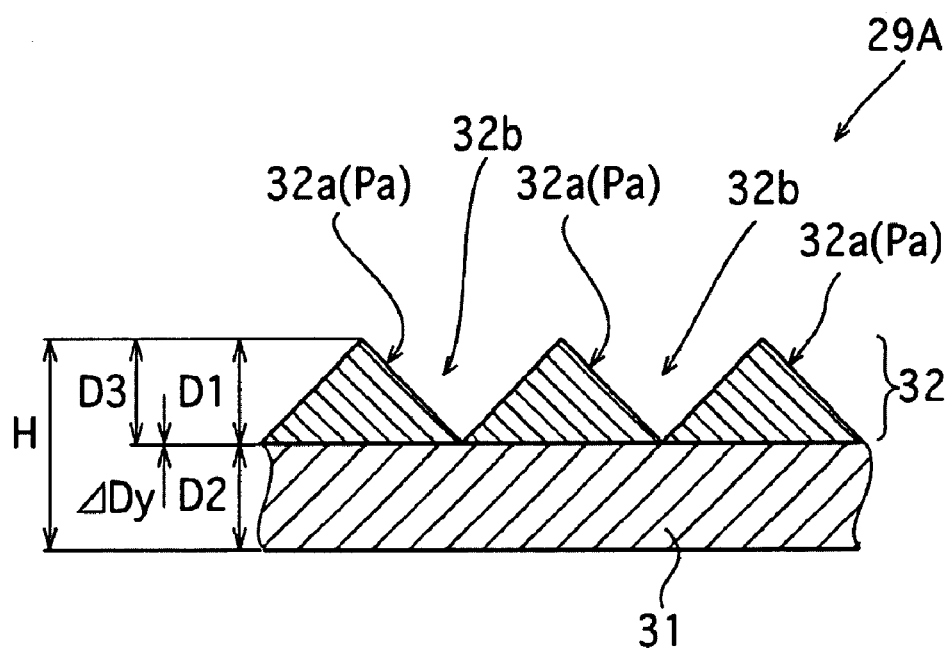
FIG. 3 is a cross sectional view showing an example of the main structure of a first prism sheet of an embodiment.

FIG. 3 is an enlarged sectional view of the main portion of the first prism sheet 29A. The first prism sheet 29A has a structure where a curing resin layer 32 is integrally laminated on the surface of a transparent base 31. The transparent base 31 is formed of a transparent resin sheet made of flexible material. The curing resin layer 32 is formed of active energy ray curing resin which is cured upon exposure to an active energy ray, such as an ultraviolet ray and an electron beam.

Figure 15:
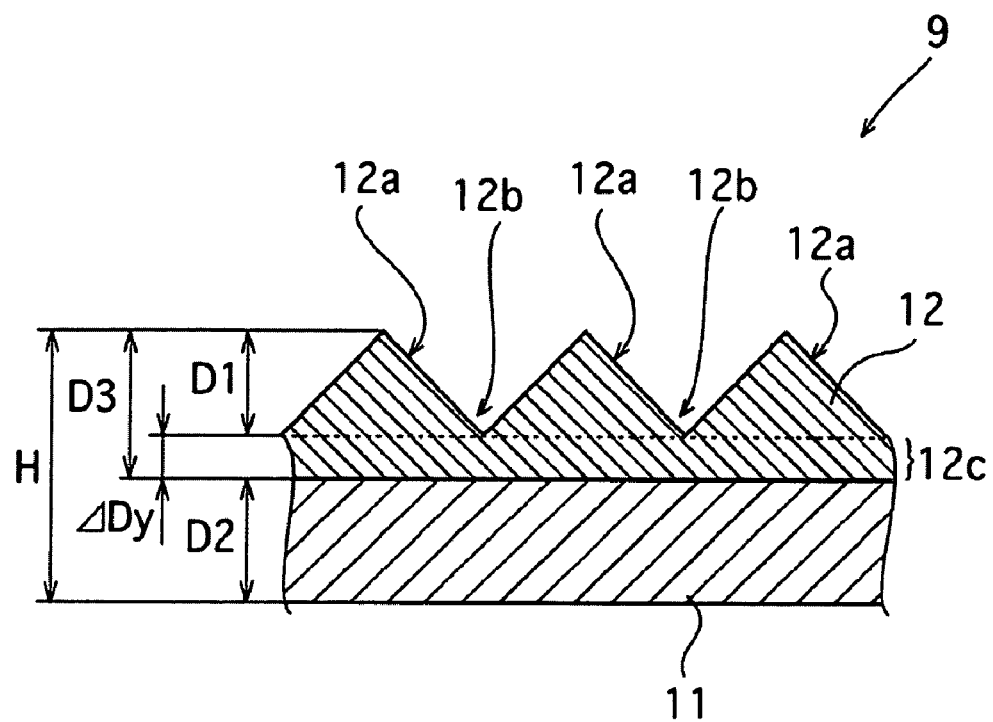
FIG. 15 is a schematic diagram showing an example of the typical structure of a prism sheet used in the related art liquid crystal display.

The curing resin layer 32 is constituted of a number of triangular prisms 32a (corresponding to Pa described above) disposed at a constant pitch. A valley portion 32b is provided between adjacent prisms 32a. A slanted plane (prism plane) of prism 32a extends to the surface of the transparent base 31, so that the valley portion 32b contacts the surface of the transparent base 31. Namely, a skirt layer (skirt layer 12c shown in FIG. 15) for supporting the prisms 32a does not exist between the transparent base 31 and prisms 32a. It is therefore possible to increase an optical transmittivity and improve a luminance more than a case when the skirt layer exists.

That "the skirt layer does not exist" is intended to mean that the skirt layer does not exist at all literally and that the skirt layer exists slightly (e.g., 0.28 μm or thinner) because of manufacture errors or the like. Namely, a thickness (ΔDy) of the skirt layer is perfectly zero or very thin. A total thickness (H) of the first prism sheet 29A is expressed by a sum of a thickness (D2) of the transparent base 31 and a thickness of the curing resin layer 32. The thickness of the curing resin layer 32 is precisely or approximately equal to a distance D3 between the bottom plane of each prism 32a and the apex thereof (i.e., a height of the prism 32a), or a depth D1 of the valley portion 32b.

Figure 4:
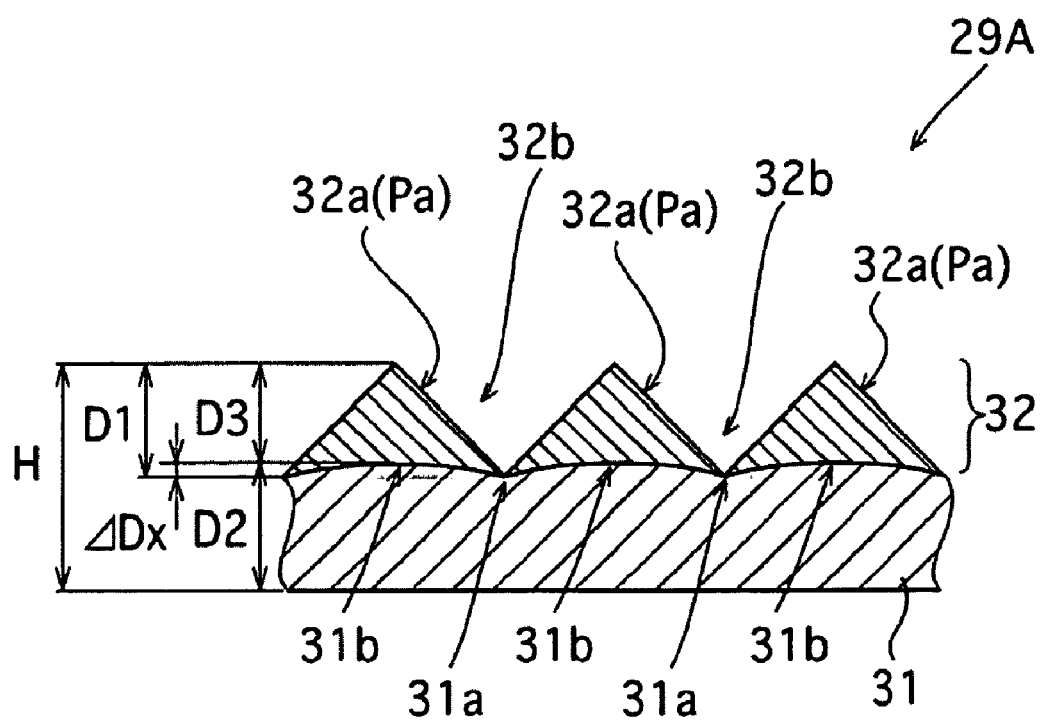
FIG. 4 is a cross sectional view showing another example of the main structure of the first prism sheet of an embodiment.

FIG. 4 is an enlarged sectional view of the main portion of another example of the structure of the first prism sheet 29A. The first prism sheet 29A shown in FIG. 4 has a lamination structure that a curing resin layer 32 is integrally laminated on the surface of a transparent base 31. The transparent base 31 is formed of a transparent resin sheet made of flexible material. The curing resin layer 32 is made of active energy ray curing resin which is cured upon exposure to an active energy ray such as an ultraviolet ray and an electron beam.

As shown in FIG. 4, the curing resin layer 32 is constituted of a number of triangular prisms 32a (Pa) disposed at a constant pitch. A valley portion 32b is provided between adjacent prisms 32a. The surface of the transparent base 31 has dents 31a corresponding to the valley portions 32b between prisms 32a. A slanted plane (prism plane) of prism 32a extends to the inner wall (bottom) of dent 31a on the surface of the transparent base 31, so that the valley portion 32b contacts the surface of the transparent base 31. Namely, a skirt layer for supporting the prisms 32a does not exist between the transparent base 31 and prisms 32a. It is therefore possible to increase an optical transmittivity and improve a luminance more than a case when the skirt layer exists. A convex curved surface 31b having a height of ΔDx is formed between adjacent dents 31a of the transparent base 31. Therefore, certain lens effect appears on the surface of the transparent base 31, and the front surface luminance can be improved further.

In the first prism sheet 29A shown in FIG. 4, the slanted plane of the prism 32a extends down to the bottom of the dent 31a of the transparent base 31, and the skirt layer does not exist at all between the transparent base 31 and prism 32a. A height of the prism 32a is therefore lower than the depth D1 of the valley portion 32b.

Used as the flexible material of the transparent base 31 is a material having tolerance or permeability relative to energy used when mold-processing the prisms 32a during manufacture processes. More specifically, when the prisms 32a are mold-processed by using active energy rays such as ultraviolet rays and electron beams, materials capable of permeating the active energy rays, such as polyester based resin, acrylic based resin, polycarbonate based resin, vinyl chloride based resin and polymethacrylimide based resin are preferable.

The curing resin constituting the prism 32a may be polyester based resin, epoxy based resin, and (meta) acrylate based resin, such as polyester(meta)acrylate, epoxy(meta)acrylate, and urethane(meta)acrylate. (Meta)acrylate resin is preferable because it has good optical characteristics. It is preferable that the main components of curing resin contain polymerization initiator such as polyatomic acrylate to be activated by an active energy ray.

Figure 5:
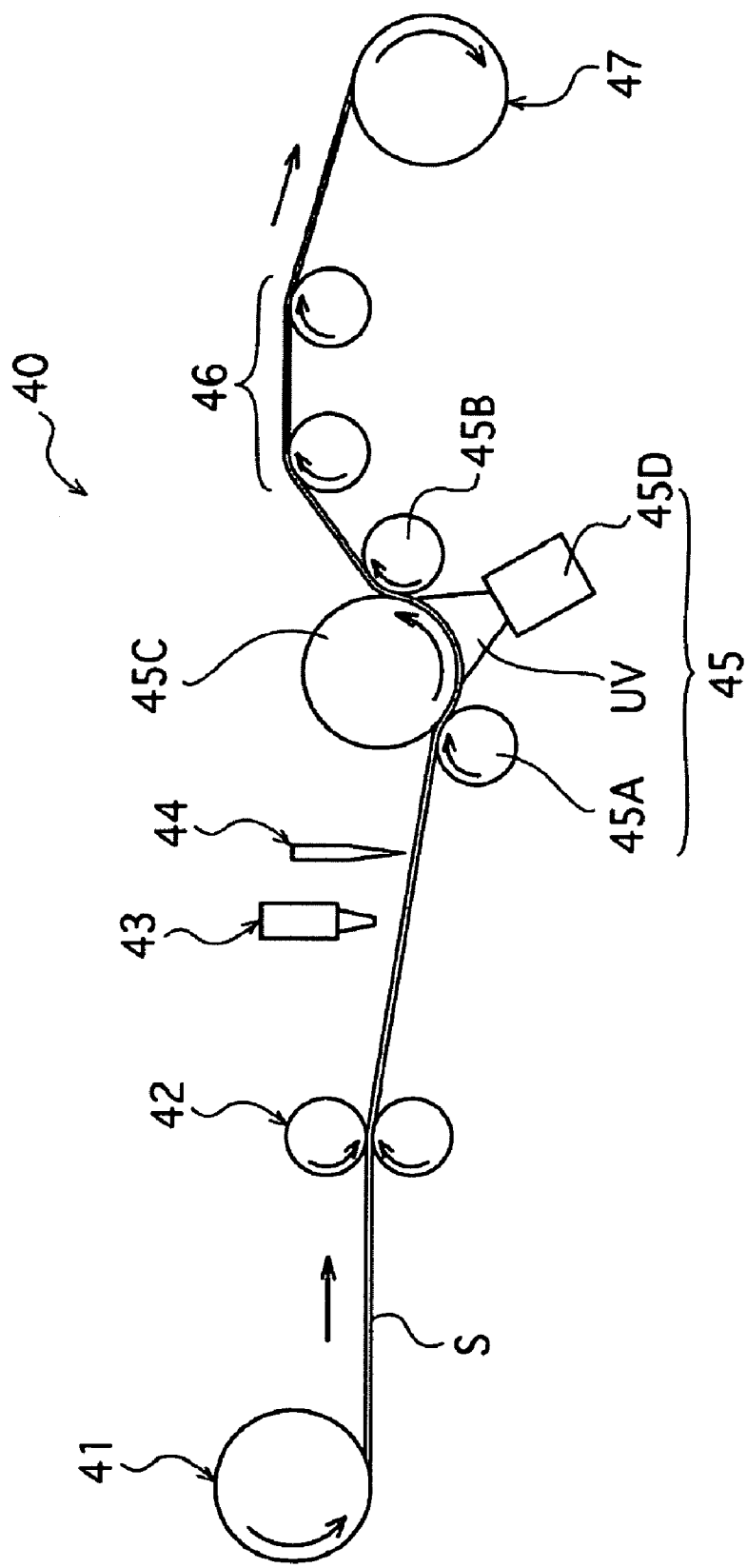
FIG. 5 is a schematic structure view showing the outline of a sheet manufacture apparatus for manufacturing the first prism sheet of an embodiment.
Figure 6:
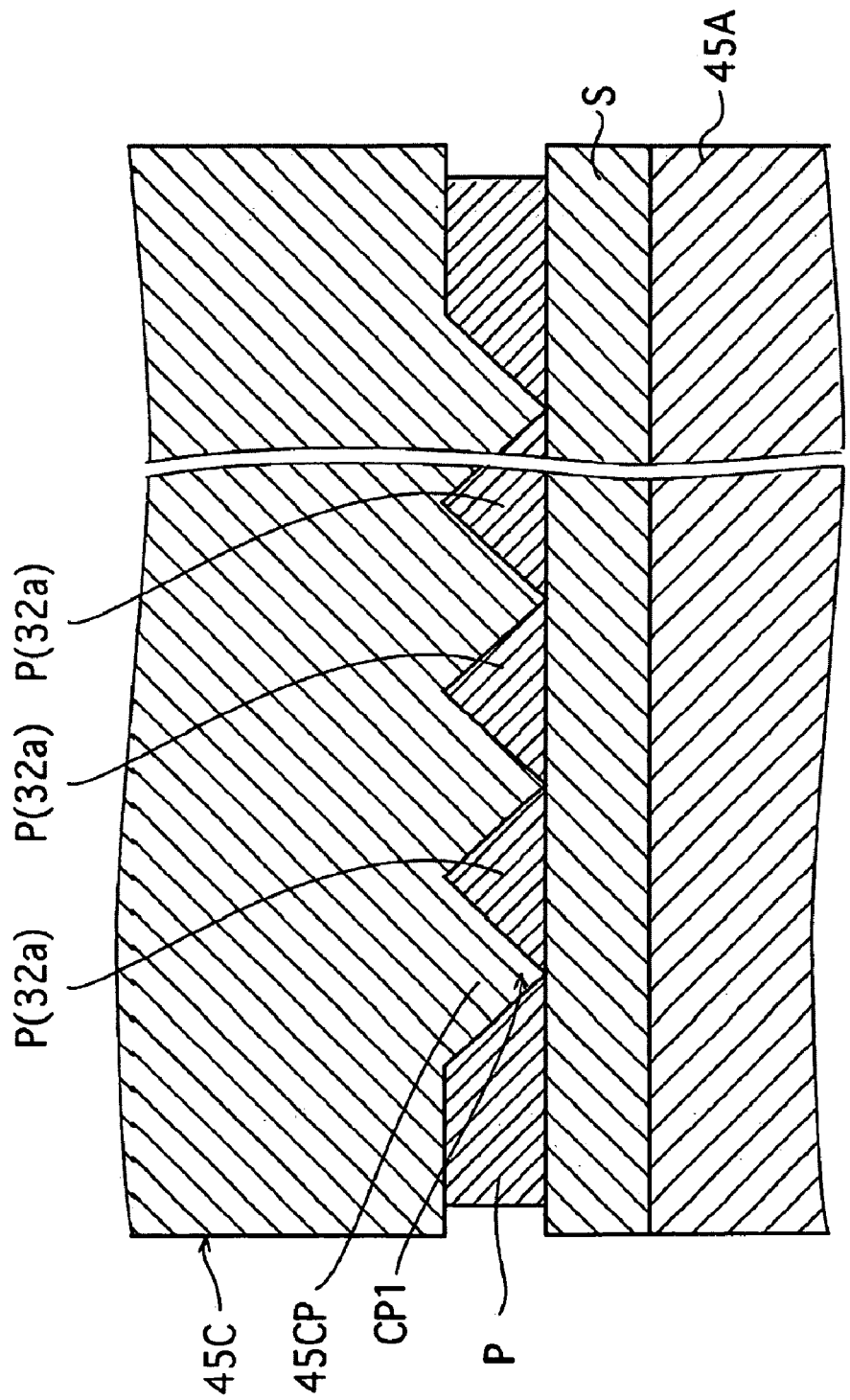
FIG. 6 is a sectional view showing the main portion of a sheet manufacture apparatus showing processes of manufacturing the prism sheet shown in FIG. 3.
Figure 7:
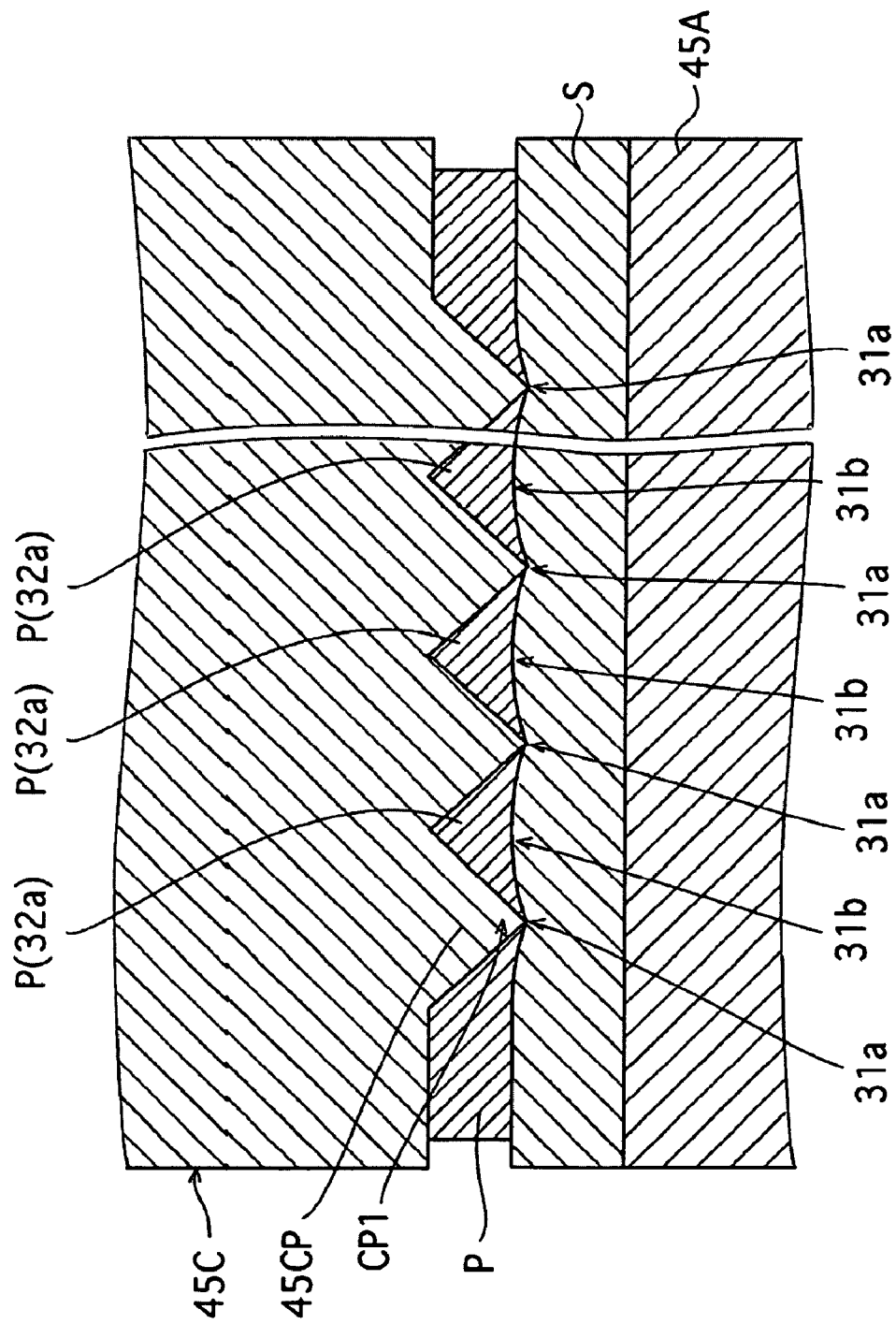
FIG. 7 is a sectional view showing the main portion of a sheet manufacture apparatus showing processes for manufacturing the prism sheet shown in FIG. 4.

Next, with reference to FIGS. 5 to 7, description will be made on an example of a manufacture method for the first prism sheet 29A described above. FIG. 5 is a diagram showing the outline structure of a sheet manufacture apparatus 40 for manufacturing the first prism sheet 29A, FIG. 6 is a sectional view showing the main portion illustrating a process of molding the prism 32a having the structure shown in FIG. 3, and FIG. 7 is a sectional view showing the main portion illustrating a process of molding the prism 32a having the structure shown in FIG. 4.

A sheet manufacture apparatus 40 is configured by including an unwinding apparatus 41 for supplying a transparent base S having long length (corresponding to the transparent base 31) cut by a predetermined width, a speed adjusting apparatus 42 for adjusting a feed speed of the transparent base S supplied from the unwinding apparatus 41, a resin supply apparatus 43 for dripping curing resin P at not cured state (FIGS. 5 and 6) down on the transparent base S, a layer thickness adjusting apparatus 44 for adjusting a thickness of the curing resin P dripped down on the transparent base S, a transfer apparatus 45 for transferring a prism pattern to the curing resin P to form a prism sheet 29A, a releasing apparatus 46 for releasing the prism sheet 29A from the transfer apparatus 45, and a winding apparatus 47 for winding the prism sheet 29A.

The transfer apparatus 45 has pressure rolls 45A and 45B, a molding roll 45C and a light source 45D disposed between the pressure rolls 45A and 45B. A number of projections 45CP for transferring prism shapes to the curing resin P are formed on a circumferential surface of the molding roll 45C, being juxtaposed along a rotation direction of the molding roll 45C. In this embodiment, ultraviolet curing resin is used for the curing resin P, and the light source 45D is constituted of a UV light source for emitting ultraviolet rays.

The transparent base S supplied from the unwinding apparatus 41 is adjusted to have a predetermined speed, by the speed adjusting apparatus 42, and the resin supply apparatus 43 drips curing resin P down on the transparent base S. The dripped curing resin P is adjusted to have a predetermined thickness by the film thickness adjusting apparatus 44, and the curing resin P whose thickness is adjusted is inputted to the transfer apparatus 45, with the surface of the curing resin being faced to the side of the molding roll 45C. The curing resin P is pushed from the transparent base S side against the molding roll 45C b, the pressure rolls 45A and 45B so that the pattern of the prisms 32a is transferred.

When the prisms 32a having the structure shown in FIG. 3 are formed, as shown in FIG. 6 the pressure rolls 45A and 45B push the molding roll 45C until the apexes CP1 of the projections 45CP contact the transparent base S. In this manner, a region where the adjacent regions of column-like curing resin P contact each other almost disappears. On the other hand, when the prisms 32a having the structure shown in FIG. 4 are to be formed, as shown in FIG. 7 the pressure rolls 45A and 45B push the molding roll 45C until the apexes CP1 of the projections 45CP almost entering the transparent base S. In this manner, not only a region where the adjacent regions of column-like curing resin P contact each other almost disappears, but also the dents 31a are formed in the region where the apexes almost entering the transparent base S. The convex curved surfaces 31b are therefore formed between adjacent dents 31a.

Next, in the state that the projections 45CP of the molding roll 45C are pressed, ultraviolet (UV) rays emitted from the light source 45D are irradiated on the curing resin P via the transparent base S. Therefore, the shape transferred to the curing resin P is fixed so that the prisms 32a are formed on the transparent base S. Thereafter, the transparent base S together with the prisms 32a is released from the transfer apparatus 45 by the releasing apparatus 46, and wound by the winding apparatus 47. Thus formed prism sheet is cut into pieces of a predetermined size to obtain first prism sheets 29A of the embodiment.

As the depth ΔDx of the dent 31a of the first prism sheet 29A shown in FIG. 4 is made deeper, the radius of curvature of the curved shape 31b can be made smaller. However, if the pressure of the pressure rolls 45A and 45B is set to be too high in order to make the dent 31a deeper, there is a possibility that the region of the dent 31a of the transparent base S (31) may become whitish, and an optical transmittivity may be lowered. To avoid this, the depth ΔDx of the dent 31a is preferably set to a depth (about 10% of or less than the thickness D2 of the transparent base S (31)) to the extent that the transparent base S (31) will not become whitish.

Next, the details of the second prism sheet 29B will be described.

Figure 8:
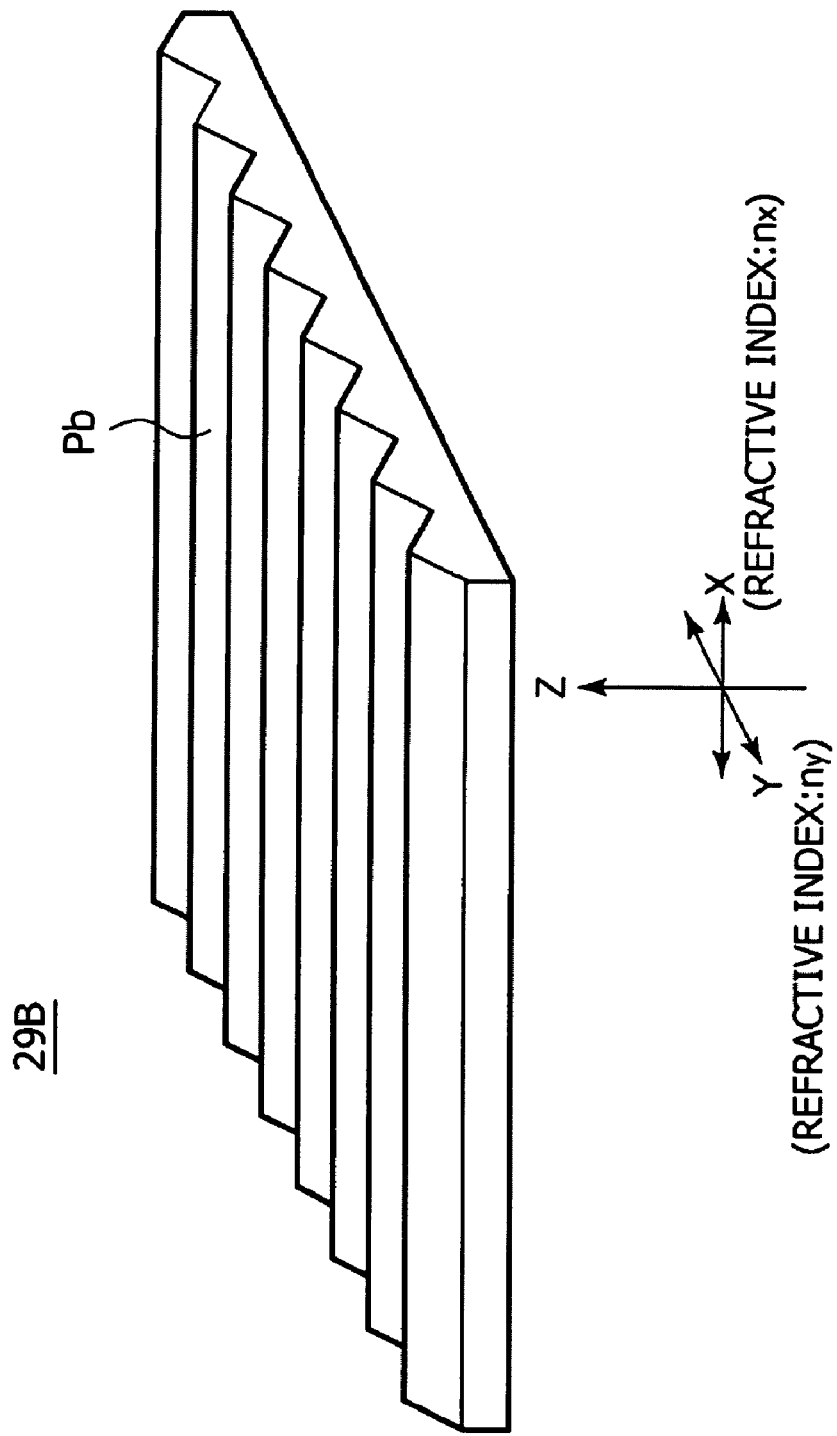
FIG. 8 is a perspective view showing an example of the whole structure of a second prism sheet of an embodiment.

FIG. 8 is a perspective view schematically showing the overall structure of the second prism sheet 29B. The second prism sheet 29B is formed of translucent resin materials and has on its one surface a prism structure plane having a number of triangular prisms Pb arranged in one direction (Y-axis direction) in series. A plane (light input plane) which is opposite to the prism structure plane is a flat plane.

The light input plane is not limited to a smooth flat plane, but it may be au uneven texture having a predetermined roughness. By using a uneven light input plane, it becomes possible to prevent a luminance from being reduced abruptly when the liquid crystal display panel is viewed obliquely.

Figure 9:
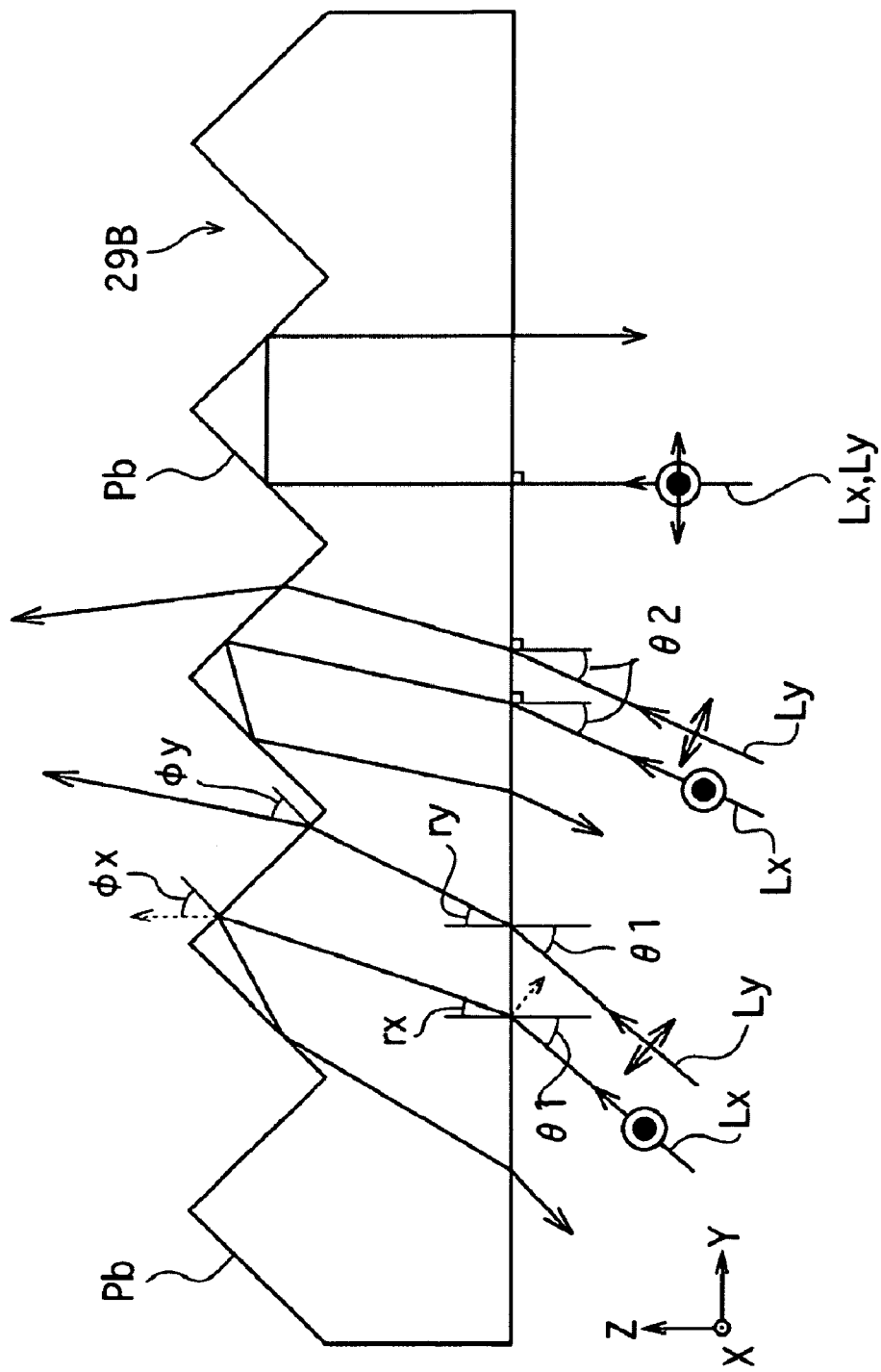
FIG. 9 is a side view illustrating the function of the second prism sheet of an embodiment.

The second prism sheet 29B has different diffractive indices in the prism extension direction (X-axis direction) and in the prism array direction (Y-axis direction). By making the refractive index of the second prism sheet 29B have in-plane anisotropy, the transmission characteristics of light incident on the second prism sheet 29B can be changed in response to a polarizing state. FIG. 9 shows paths of light incident upon the second prism sheet 29B, and shows particularly the case in which a refractive index nx in the prism extension direction is higher than a refractive index ny in the prism array direction (nx>ny). Lx indicates polarizing components of backlight L oscillating in the prism extension direction, and Ly indicates polarizing components of backlight L oscillating in the prism array direction.

Referring to FIG. 9, of the backlight obliquely incident upon the flat light input plane of the second prism sheet 29B at an incidence angle θ1, the polarizing components Lx and polarizing components Ly of the backlight refract at different refractive angles rx and ry (rx<ry) because of different refractive indices of the prism sheet 29B in the prism Pb extension and array directions, and output from the prism slanted plane at different output angles φx and φy (φx>φy).

In the example described above, both the polarizing components Lx and Ly are output from the light output plane (prism structure plane) of the prism sheet 29B. However, since the prism extension and array directions have different refractive indices, the polarizing components oscillating in each different directions are reflected at different reflective indices at the interfaces including the light input plane and prism slanted plane of the prism sheet 29B. Therefore, since the refractive index nx in the prism extension direction is set to be higher than the refractive index ny in the prism array direction, a reflection amount of the polarizing components Lx oscillating in the prism extension direction is larger than that of the polarizing components Ly. Of the backlight transmitted through the second prism sheet 29B, the polarizing components Ly have therefore a larger amount of light than that of the polarizing components Lx.

Since the light output angles of the polarizing components Lx and Ly output from the prism slanted plane have a relation of (φx>φy, if an incidence angle of backlight incident on the prism sheet 29B satisfies certain condition, a perfect polarization separation state can be realized in which the polarizing components Lx repeat total reflection at the prism slanted plane and become return light, and only the polarizing components Ly transmit through the prism sheet 29B. An example of the perfect polarization separation state is shown in FIG. 9 at an incidence angle θ2. A specific example of θ2 is about 11 degrees to 25 degrees under the conditions of nx=1.9, ny=1.6 and an apex angle of the prism Pb is 90 degrees.

On the other hand, if an incidence angle of backlight relative to the second prism sheet 29B becomes too small, this state becomes the same as the state that backlight enters the light input plane of the prism sheet 29B at a right angle. In this case, as shown in FIG. 9, the backlight L repeats total reflection at the slanted plane of the prism Pb and becomes return light returning to the backlight side, irrespective of the polarizing state.

As described above, by making the second prism sheet 29B have the in-plane refractive index anisotropy (birefringence), a constant polarization separation function can be obtained in addition to a backlight convergence function. Further, in each example described above, light reflected by the prism sheet 29B reflects at the surfaces of the first prism sheet 29A, diffusion plate 28 and light guide plate 25 to be unpolarized, and becomes again incident upon the second prism sheet 29B. It is therefore possible to increase a light use efficiency and contribute to improvement in the front surface luminance.

A magnitude of birefringence of the second prism sheet 29B is 0.05 or larger, preferably 0.2 or larger, and more preferably 0.25 or larger. The larger the birefringence is, polarization selectivity can be improved further and an improvement rate of the front surface luminance can be increased.

Next, description will be made on an example of the manufacture method for the second prism sheet 29B constructed as above.

The second prism sheet 29B of the embodiment is manufactured by a process of molding a resin sheet having a prism structure plane formed on one surface and a process of drawing the resin sheet in the prism extension direction to make the resin sheet have different refractive indices in the prism extension and array directions.

The above-described resin sheet molding method is not specifically limited. For example, a heat pressing method, a melt extrusion processing method or the like may also be employed. By using a flat resin sheet as a base, a prism layer may be formed on the flat resin sheet. It is preferable to use a process capable of continuously forming a resin sheet in a roll manner.

Figure 10A:
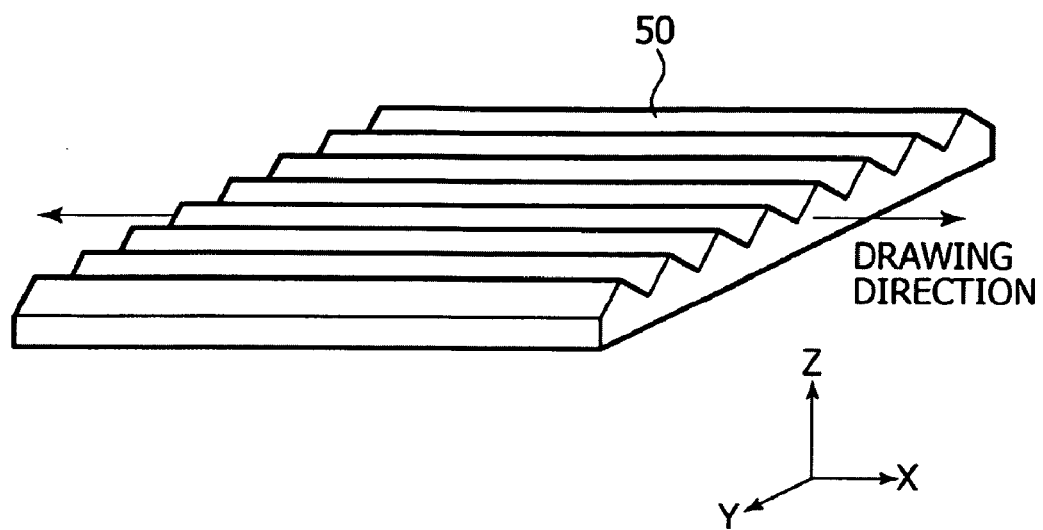
FIG. 10 is a diagram illustrating a manufacture method for the second prism sheet of an embodiment.

The formed resin sheet is drawn in the prism extension direction to give refractive index anisotropy. The second prism sheet 29B of the embodiment is structured in such a manner that the refractive index nx in the prism extension direction is higher than the refractive index ny in the prism array direction. Therefore, as shown in FIG. 10A, desired prism sheet 29B can be obtained by forming a resin sheet 50 by using resin materials having a higher refractive index in the drawing direction, and thereafter drawing the resin sheet 50 in the prism extension direction (X-axis direction). A drawing rate can be properly set in accordance with a required in-plane refractive index difference, the kind of material of the resin sheet 50 and the like.

Resin material having a higher refractive index in the drawing direction may be polyethylene terephthalate (PET), polyethylene naphthalate (PEN), mixture thereof, copolymer such as PET-PEN copolymer, polycarbonate, polyvinyl alcohol, polyester, polyvinylidene fluoride, polypropylene, polyamide or the like.

Figure 10B:
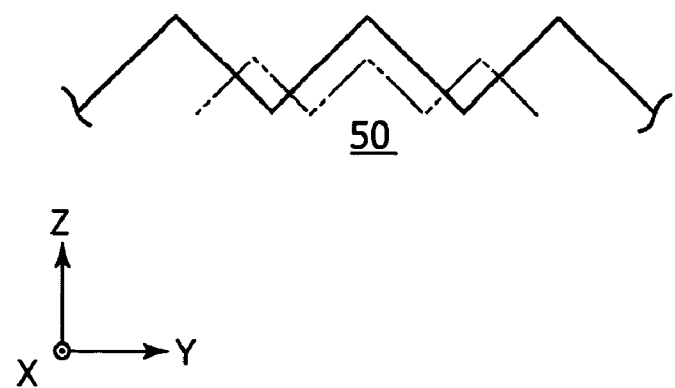

The reason why the drawing direction is set to be the prism extension direction is to suppress the target optical characteristics from being varied by a variation in the prism shape before and after drawing. FIG. 10B shows an outer shape change in the prism structure plane before and after drawing. A solid line indicates the shape before drawing, and dashed-dotted lines indicates the shape after drawing. By setting the drawing direction to be the prism extension direction (X-axis direction), a prism cross sectional shape after drawing becomes approximately analogous to a prism cross sectional shape before drawing. It is therefore possible to suppress a variation of the optical characteristics and control a required prism shape at a high precision.

If it is structure that a refractive index in the prism array direction is higher than the refractive index in the prism extension direction, resin material having a lower refractive index in the drawing direction may be used to draw the resin sheet in the prism extension direction. Resin material having a lower refractive index in the drawing direction may be methacrylic resin such as polymethylmethacrylate, polystyrene resin, styrene-acrylonitrile copolymer (AS resin), styrene-methylmethacrylate copolymer, mixture thereof or the like.

In the liquid crystal display 21 of the embodiment structured as above, light emitted from the light source 26 becomes incident on the light guide plate 25, and thereafter is output from the upper surface (light output plane) of the light guide plate 25. Light output from the light guide plate 25 becomes incident on the diffusion sheet 28 to be diffused evenly, is thereafter directed toward the front surface direction by the optical sheet combination structure 30 (first prism sheet 29A and second prism sheet 29B), and becomes incident on the liquid crystal display panel 22 via the first polarizer 23A. Light incident upon the liquid crystal display panel 22 transmits in accordance with a magnitude of a voltage applied per each pixel between the transparent pixel electrode 37A and opposed transparent electrode 37B, is color-separated by the color filter 36, and thereafter output to an observer side via the second polarizer. In this manner, a color image is displayed on the front surface of the liquid crystal display panel 22.

The operation of the optical sheet combination structure 30 will be described.

Figure 11:
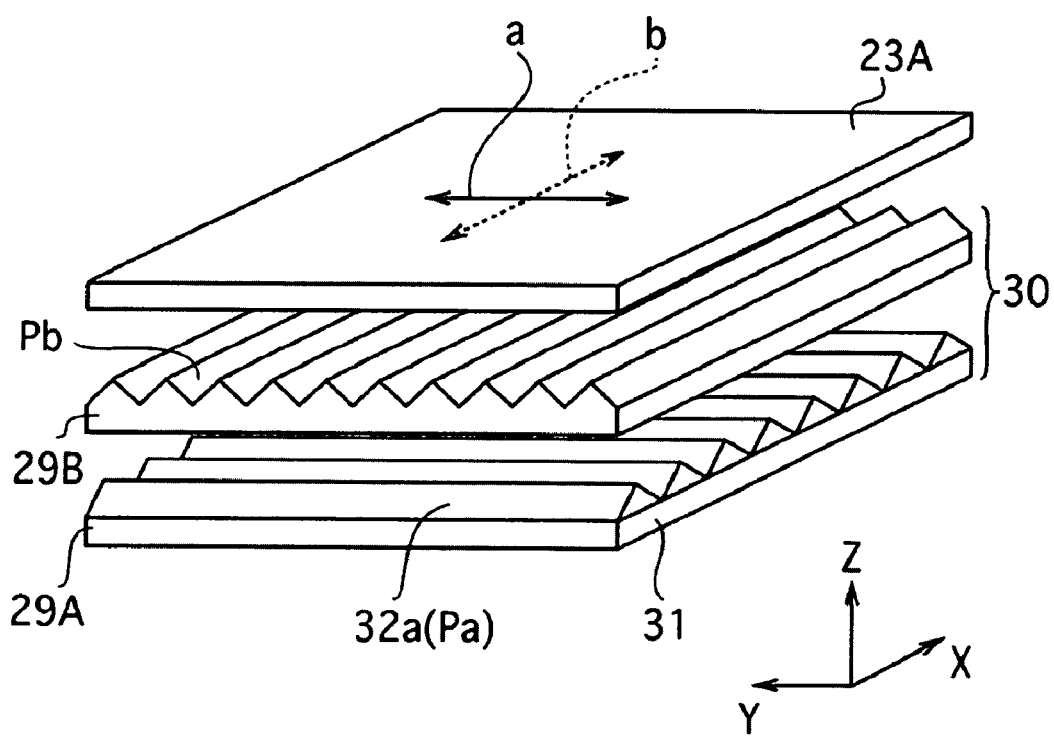
FIG. 11 is a perspective view showing the main portion showing a relation between the second prism sheet and a first polarizer of the embodiment.
Figure 12:
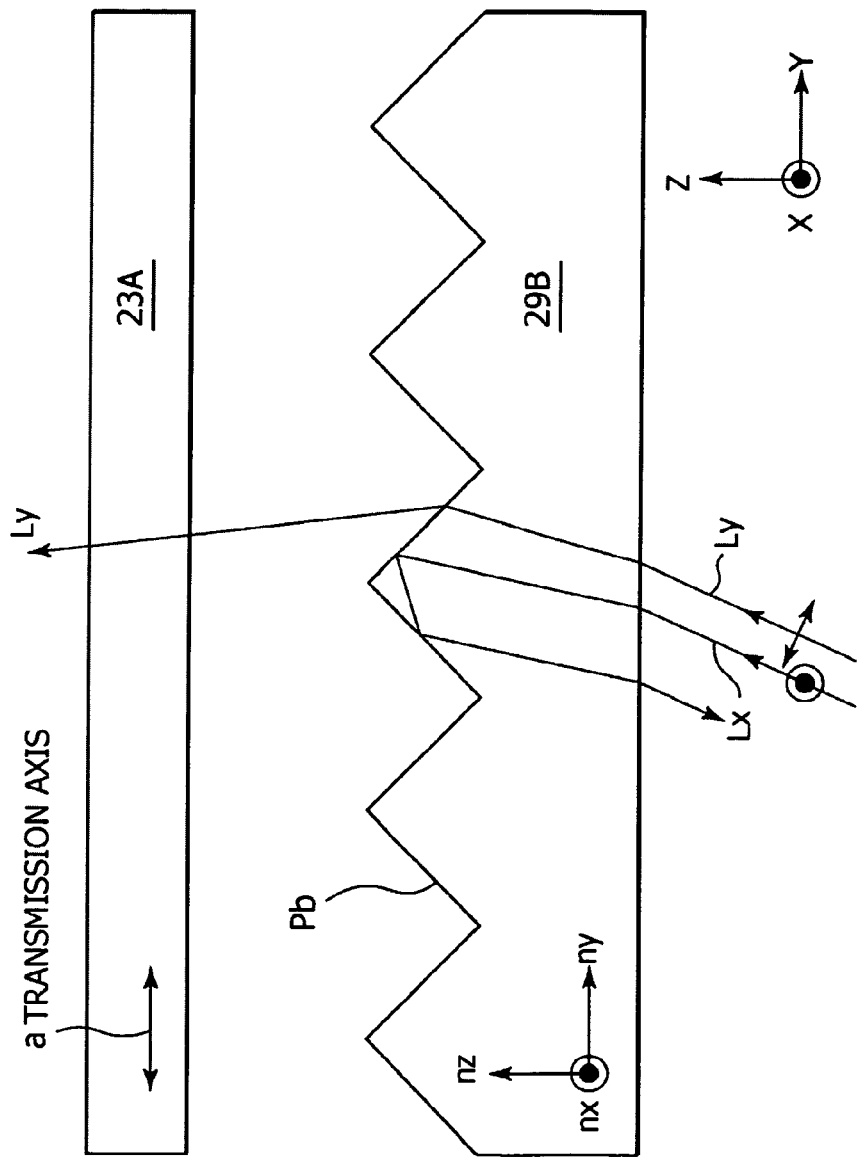
FIG. 12 is a side view of the main portion showing a relation between the second prism sheet and a first polarizer of an embodiment.

FIG. 11 is a perspective view showing a relative positional relation between the optical sheet combination structure 30 and first polarizer 23A. FIG. 12 is a side view of a main portion illustrating the relative positional relation between the second prism sheet 29B and first polarizer 23A.

The first and second prism sheets 29A and 29B are disposed with each prism structure plane being directed toward the first polarizer 23A side. The extension direction (Y-axis direction) of the prisms Pa of the first prism sheet 29A is perpendicular to the extension direction (X-axis direction) of the prisms Pb of the second prism sheet 29B. Since the second prism sheet 29B is structured in such a manner that a refractive index in the prism Pb extension direction (X-axis direction) is higher than a refractive index in the prism Pb array direction (Y-axis direction), the array direction of the prism Pb which is the lower refractive index direction is disposed in alignment with the transmission axis "a" direction of the first polarizer 23A. "b" indicates the transmission axis direction of the second polarizer 23B, and this direction is perpendicular to the transmission axis "a" of the first polarizer 23A. The "b" also corresponds to the absorption axis of the first polarizer 23A.

With this arrangement, of light incident on the optical sheet combination structure 30, light propagating in the XZ plane refracts and transmits in the prism Pa of the first prism sheet 29A to be deflected toward the front surface direction (Z-axis direction), whereas light propagating in the YZ plane refracts and transmits in the prism Pb of the second prism sheet 29A to be deflected toward the front surface direction. By disposing two prism sheet perpendicular to each other, backlight can be directed efficiently toward the front surface direction. It is therefore possible to improve the front surface luminance of the liquid crystal display 21 and become suitable for mobile use liquid crystal displays.

In the first prism sheet 29A, as shown in FIGS. 3 and 4, the transparent base 31 contacts the valley portion 32b between adjacent prisms 32a (Pa) so that the skirt layer not functioning as the prism does not exist between the transparent base 31 and prism 32a. An optical transmissivity increases more than when the skirt layer exists whereby the luminance can be improved.

Especially when the dents 31a are formed on the surface of the transparent base 31 corresponding to the valley portions 32b and the convex curved surfaces 31b are formed on the surface of the transparent base between dents 31a as shown in FIG. 4, certain lens effect appears on the surface of the transparent base 31 so that the front surface luminance can be improved further.

The second prism sheet 29B converges light output from the preceding stage first prism sheet 29A toward the front surface direction, and outputs the light toward the first polarizer 23A. In this case, since the second prism sheet 29B is formed such that the refractive index (nx) in the prism Pb extension direction is higher than the refractive index (ny) in the prism Pb array direction, the backlight to be transmitted through the prism sheet 29B has a larger amount of the polarizing components Ly than that of the polarizing components Lx, as described with reference to FIG. 9. A quantitative ratio of the polarizing components Ly to the polarizing components Lx depends on a difference between the refractive index in the prism array direction of the prism sheet 29B and the refractive index in the prism extension direction and a distribution of angles of backlight incident upon the prism sheet 29B.

Therefore, the second prism sheet 29B of the embodiment has not only the light convergence function but also a constant polarization separation function. As shown in FIG. 12, of backlight output from the second prism sheet 29B, an output light amount of the polarizing components Lx in the prism Pb extension direction can therefore be made smaller than an output light amount of the polarizing components Ly in the prism Pb array direction. It is therefore possible to efficiently use backlight by reducing an absorption amount of backlight in the first polarizer 23A. Namely, a front surface luminance can be improved by increasing an extracting efficiency of backlight.

As described above, according to the liquid crystal display 21 of the embodiment, in addition to the luminance improvement effect obtained by superposing two prism sheets, the second prism sheet 29B has a function similar to that of the related art reflective polarizing sheet so that it becomes possible to not require the reflective polarizing sheet. The number of optical sheets to be set required for improving the front surface luminance can therefore be reduced. A total thickness of optical sheets can be thinned and the liquid crystal display can made sufficiently thin.

Particularly in a mobile use liquid crystal display, the transmission axis of the first polarizer on the backlight side is often disposed by rotating several tens of degrees at the maximum from the cross Nicol state relative to the second polarizer, in order to optimize the display characteristics such as contrast when phase difference film is combined. In a related art liquid crystal display, therefore, an angle shift between the transmission axis of the first polarizer and the polarizing components output from the reflective polarizing sheet becomes large, posing a problem that lowering rate of the front surface luminance is prominent.

Figure 13:
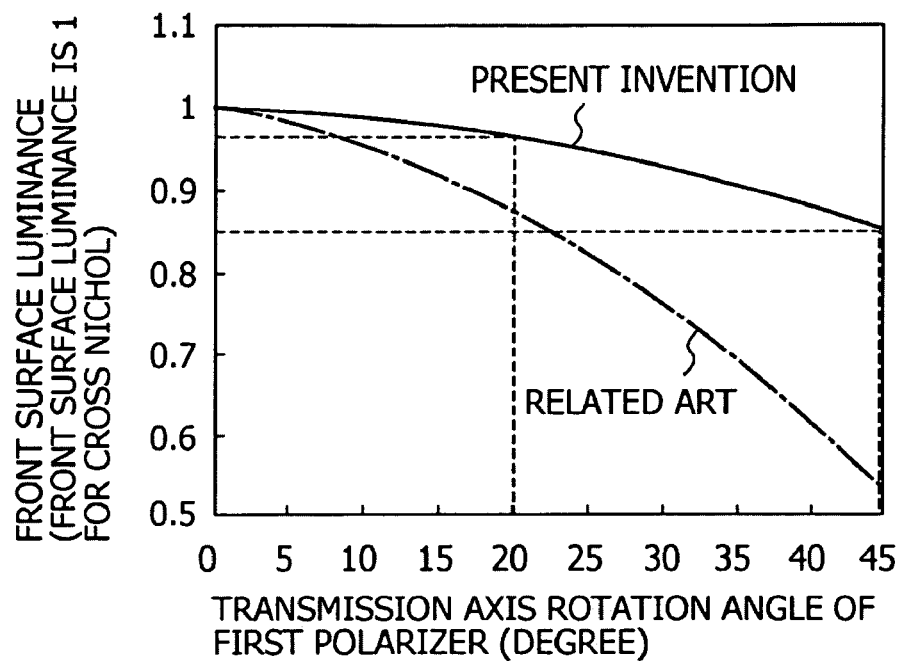
FIG. 13 is a diagram illustrating one of the operations of the liquid crystal display of an embodiment.
Figure 14:
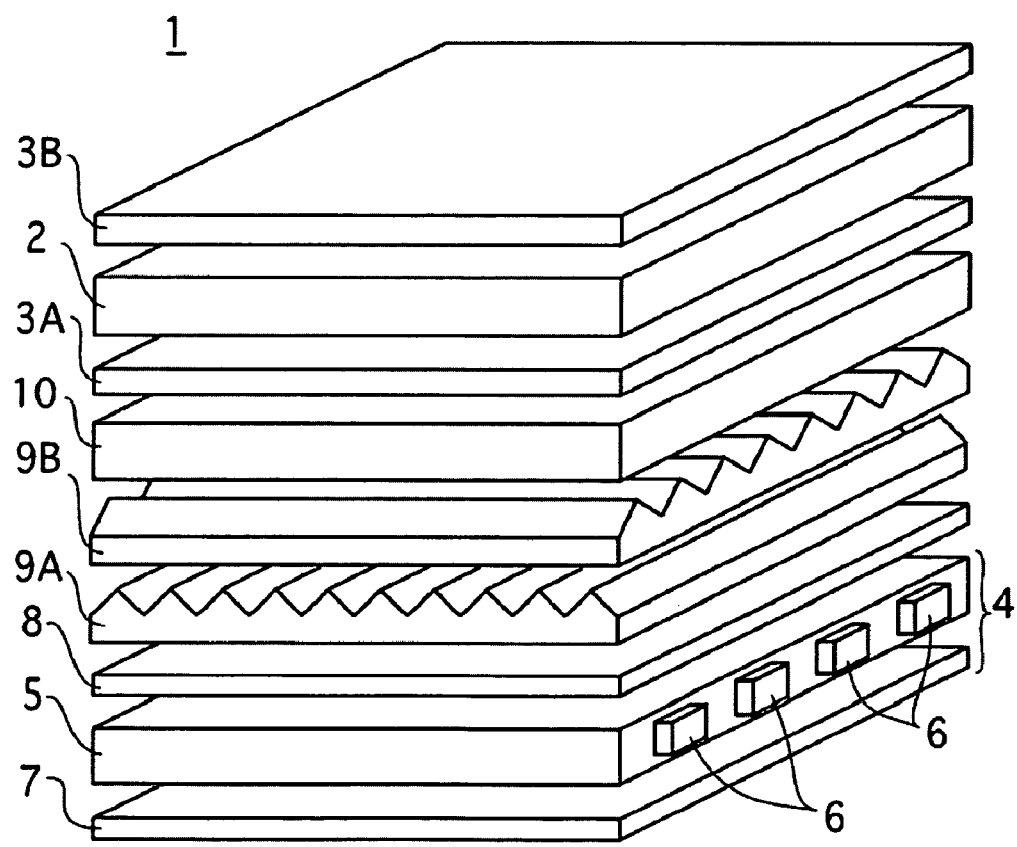
FIG. 14 is a perspective view showing the whole outline structure of a related art liquid crystal display.
Figure 16:
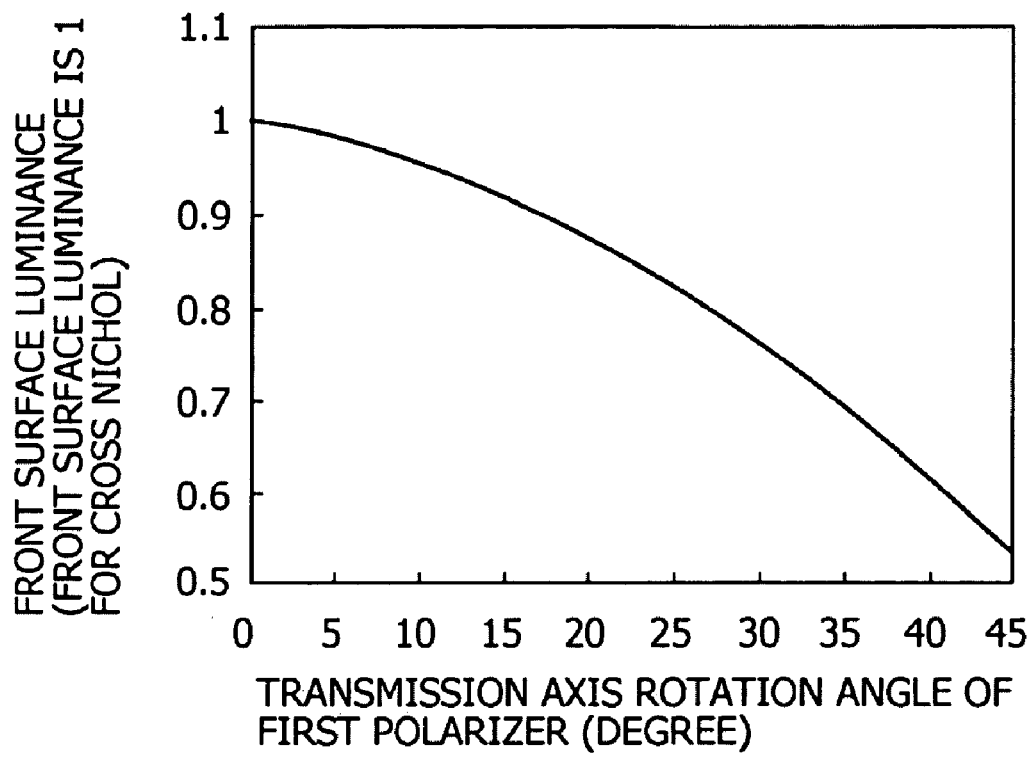
FIG. 16 is a diagram illustrating an example of the operations of a related art liquid crystal display.

In contrast, in the liquid crystal display 21 of the embodiment, the polarizing function of the second prism sheet 2B can be adjusted by its in-plane refractive index difference (birefringence). It is therefore possible to optimize the polarizing characteristics considering the rotation adjustment amount of the transmission axis of the first polarizer 23A. FIG. 13 shows an example of the relation between the transmission axis of the second polarizer and a rotation angle of the transmission axis of the first polarizer, when the front surface luminance at the cross Nicol state is set to be "1". In FIG. 13, a solid line indicates the liquid crystal display equipped with the optical sheet combination structure 30 of the embodiment, and a dashed-dotted line indicates the liquid crystal display equipped with a related art reflective polarizing sheet, indicating the same data as that shown in FIG. 16.

As apparent from FIG. 13, according to an embodiment, by combining two prism sheets of the present invention, each luminance improvement rate is added together, and whereby a front surface luminance can be achieved which is equal to that of a combination of three conventional reflective polarizing sheets.

Furthermore, a reduction rate of the luminance is small relative to a rotation angle of the transmission axis of the first polarizer. A luminance reduction rate is 3% or smaller when a rotation angle is 20 degrees, and a luminance reduction rate is 15% or smaller when a rotation angle is 45 degrees. A birefringence of the second prism sheet 29B used in the liquid crystal display of the embodiment is 0.26. The luminance reduction rate relative to the rotation angle of the polarizer can be adjusted by the birefringence of the second prism sheet 29B.

According to an embodiment, therefore, it is possible to minimize a front surface luminance reduction caused by the angle shift between the transmission axis of the first polarizer and the anisotropic optical axis of the second prism sheet 29B. It is therefore possible to easily realize an optimum sheet adjustment in accordance with the necessary luminance characteristics, display characteristics and the like, and to provide liquid crystal displays of a plurality of types by using sheets of the same kind.

The present application has been described above according to an embodiment, where suitable modifications thereof are contemplated.

For example, although the in-plane refractive index difference of the second prism sheet 29B is set to be nx>ny in the embodiment, the difference may be set to be nx<ny. In this case, resin material may be used which has a lower refractive index in the drawing direction when it is drawn in the prism extension direction. Also in this case, it is preferable that the prism array direction is set to be a direction perpendicular to the transmission axis of the first polarizer 23A.

Further, although drawing is used for providing the second prism sheet 29B with refractive index anisotropy in the embodiment, the invention is not limited thereto. For example, liquid crystal material having refractive index anisotropy may be directed, or crystal material having refractive index anisotropy may be used, to form a prism sheet, thereby realizing refractive index anisotropy between the prism extension and array directions.

As described above, according to an embodiment, a total thickness of optical sheets necessary for improving the front surface luminance can be thinned. Also, a reduction in the luminance caused by the rotation adjustment of the polarizer can be suppressed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical sheet combination structure disposed between a polarizer and a surface emitting unit, comprising:
   a first optical sheet including a transparent base layer and an array of columnar cubic structures of curing resin integrally laminated on the transparent base layer, a valley portion between adjacent cubic structures contacting a surface of the transparent base; and
   a second optical sheet disposed nearer to the side of the polarizer than the first optical sheet, having a number of columnar cubic structures arrayed on a surface, and a refractive index of the cubic structures along an extension direction thereof being different from a refractive index of the cubic structures along an array direction thereof, wherein the first and second optical sheets are disposed with prism formed planes faced to a side of the polarizer, and wherein the first and second optical sheets are combined by making the extension directions of the cubic structures of the first and second optical sheets cross at right angles, wherein the transparent base layer has dents corresponding to valley portions between the cubic structures that extend along an extension direction of the cubic structures.

2. The optical sheet combination structure according to claim 1, wherein;

the cubic structure has a slanted plane extending down to a bottom of the dent.

3. The optical sheet combination structure according to claim 1, wherein;

the transparent base layer has a convex curved surface between the valley portions of adjacent cubic structures.

4. The optical sheet combination structure according to claim 1, wherein;

the second optical sheet is formed of a resin sheet drawn in the extension direction of the cubic structures.

5. The optical sheet combination structure according to claim 1, wherein;

the second optical sheet has a higher refractive index of the cubic structures along the extension direction thereof than a refractive index of the cubic structures along the array direction thereof.

6. The optical sheet combination structure according to claim 5, wherein;

the second optical sheet includes material having a high refractive index in a drawing direction.

7. The optical sheet combination structure according to claim 6, wherein;

the second optical sheet includes polyethylene terephthalate (PET), polyethylene naphthalate (PEN), mixture thereof, or copolymer such as PET-PEN copolymer.

8. The optical sheet combination structure according to claim 1, wherein;

the second optical sheet has a higher refractive index of the cubic structure along the array direction thereof than a refractive index of the cubic structures along the extension direction thereof.

9. The optical sheet combination structure according to claim 8, wherein;

the second optical sheet includes material having a low refractive index in a drawing direction.

10. The optical sheet combination structure according to claim 1, wherein;

the second optical sheet has a birefringence of 0.05 or higher.

11. The optical sheet combination structure according to claim 1, wherein;

a total thickness of a combined set of the first and second optical sheets is 100 μm or thinner.

12. The optical sheet combination structure according to claim 1, wherein;

the cubic structure of the first optical sheet is a prism or a lenticular lens.

13. The optical sheet combination structure according to claim 1, wherein;

the cubic structure of the second optical sheet is a prism or a lenticular lens.

14. A surface emitting device, comprising:

a polarizer;

a surface emitting unit; and an optical sheet combination structure disposed between the polarizer and the surface emitting unit, wherein;

the optical sheet combination structure includes:

a first optical sheet including a transparent base layer and an array of columnar cubic structures formed of curing resin integrally laminated on the transparent base, and a valley portion between adjacent cubic structures contacting a surface of the transparent base; and a second optical sheet disposed at the side nearer to the polarizer than the first optical sheet, having a number of columnar cubic structures arrayed on a surface, a refractive index of the cubic structures along an extension direction thereof being different from a refractive index of the cubic structures along an array direction thereof, wherein the first and second optical sheets are disposed with prism formed planes faced to a side of the polarizer, and wherein the first and second optical sheets are combined by making the extension directions of the cubic structures of the first and second optical sheets cross at right angles, wherein the transparent base layer has dents corresponding to valley portions between the cubic structures that extend along an extension direction of the cubic structures.

* * * * *